(12) United States Patent
Kobayashi et al.

(10) Patent No.: US 11,310,628 B2
(45) Date of Patent: Apr. 19, 2022

(54) WIRELESS COMMUNICATION DEVICE, INFORMATION PROCESSING DEVICE, AND PROCESSING METHOD THEREFOR

(71) Applicant: SONY SEMICONDUCTOR SOLUTIONS CORPORATION, Kanagawa (JP)

(72) Inventors: Seiji Kobayashi, Kanagawa (JP); Shinichi Kitazono, Kanagawa (JP); Toshihiro Fujiki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/040,529

(22) PCT Filed: Feb. 6, 2019

(86) PCT No.: PCT/JP2019/004155
§ 371 (c)(1),
(2) Date: Sep. 22, 2020

(87) PCT Pub. No.: WO2019/187662
PCT Pub. Date: Oct. 3, 2019

(65) Prior Publication Data
US 2021/0021960 A1    Jan. 21, 2021

(30) Foreign Application Priority Data

Mar. 30, 2018  (JP) .............................. JP2018-066664

(51) Int. Cl.
*H04W 4/02* (2018.01)
*H04W 4/029* (2018.01)
*G01S 19/51* (2010.01)

(52) U.S. Cl.
CPC ........... *H04W 4/023* (2013.01); *H04W 4/029* (2018.02); *G01S 19/51* (2013.01)

(58) Field of Classification Search
CPC . H04W 72/0446; H04W 72/04; H04W 64/00; H04W 24/10; H04W 72/1263;
(Continued)

(56) References Cited

U.S. PATENT DOCUMENTS

2005/0107948 A1* 5/2005 Catalinotto ............ G01C 21/00
                                                         701/409
2009/0061891 A1* 3/2009 Chung ................. G08B 27/006
                                                         455/456.1
(Continued)

FOREIGN PATENT DOCUMENTS

CN      105979199 A     9/2016
EP      3226510 A1      10/2017
(Continued)

OTHER PUBLICATIONS

International Search Report and Written Opinion of PCT Application No. PCT/JP2019/004155, dated Apr. 16, 2019, 11 pages of ISRWO.

*Primary Examiner* — Dung Hong
(74) *Attorney, Agent, or Firm* — Chip Law Group

(57) ABSTRACT

An object of the present invention is to secure a relative relationship when positions are displayed by use of position information transmitted from a plurality of wireless communication devices. Each of the wireless communication devices of the present invention includes a position information acquisition unit and a transmission unit. The position information acquisition unit acquires the position information of the wireless communication devices by the GPS, for example. At that time, the position information acquisition unit also acquires time information when the position information is acquired. The transmission unit transmits trans- (Continued)

mission data including the position information and the time information when the position information is acquired in a predetermined transmission slot.

10 Claims, 16 Drawing Sheets

(58) Field of Classification Search
CPC .. H04W 4/02; H04W 72/1284; H04W 72/121
See application file for complete search history.

(56) References Cited

U.S. PATENT DOCUMENTS

| | | | | |
|---|---|---|---|---|
| 2010/0074133 | A1* | 3/2010 | Kim | G01S 5/0289 |
| | | | | 370/252 |
| 2010/0246438 | A1* | 9/2010 | Potkonjak | G01S 5/0278 |
| | | | | 370/254 |
| 2012/0233086 | A1* | 9/2012 | Shin | G06Q 10/047 |
| | | | | 705/338 |
| 2013/0184984 | A1* | 7/2013 | Armitage | G01C 21/20 |
| | | | | 701/409 |
| 2017/0279571 | A1* | 9/2017 | Melodia | H04L 1/0003 |
| 2017/0289759 | A1 | 10/2017 | Acharya et al. | |
| 2020/0305116 | A1* | 9/2020 | Berggren | H04B 17/318 |

FOREIGN PATENT DOCUMENTS

| | | |
|---|---|---|
| JP | 10-160820 A | 6/1998 |
| JP | 2011-047843 A | 3/2011 |
| JP | 2011-133381 A | 7/2011 |
| JP | 2012-157510 A | 8/2012 |
| JP | 2016-073774 A | 5/2016 |
| JP | 2016-169967 A | 9/2016 |
| JP | 2017-187486 A | 10/2017 |
| KR | 10-2009-0021595 A | 3/2009 |

* cited by examiner

WIRELESS COMMUNICATION DEVICE, INFORMATION PROCESSING DEVICE, AND PROCESSING METHOD THEREFOR

CROSS REFERENCE TO RELATED APPLICATIONS

This application is a U.S. National Phase of International Patent Application No. PCT/JP2019/004155 filed on Feb. 6, 2019, which claims priority benefit of Japanese Patent Application No. JP 2018-066664 filed in the Japan Patent Office on Mar. 30, 2018. Each of the above-referenced applications is hereby incorporated herein by reference in its entirety.

TECHNICAL FIELD

The present technology relates to a wireless communication device. Specifically, the present technology relates to a wireless communication device that transmits position information, an information processing device that uses the position information from the wireless communication device, and a processing method for these devices.

BACKGROUND ART

In recent years, mobile terminals having a global positioning system (GPS) function have become widespread, and systems using the mobile terminals are known. For example, a system has been proposed that acquires position information of a user participating in sports activities and generates performance data of the user (see, for example, Patent Document

CITATION LIST

Patent Document

Patent Document 1: Japanese Patent Application Laid-Open No. 2016-073774

SUMMARY OF THE INVENTION

Problems to be Solved by the Invention

In the above-described conventional technology, the mobile terminal transmits data of the user during an exercise session together with the position information. However, since the transmission from the mobile terminal occurs discretely and asynchronously, a relative mismatch may occur when the user tries to display the position information in real time. For example, there is a possibility of giving a misunderstanding as if an overtaking, which has not originally occurred, had occurred among competitors.

The present technology has been made in view of such a situation, and an object thereof is to secure a relative relationship when position information is displayed.

Solutions to Problems

The present technology has been made to solve the above-mentioned problems, and a first aspect thereof is a wireless communication device including: a position information acquisition unit that acquires position information together with time information of the position information; and a transmission unit that transmits transmission data including the position information and the time information in a predetermined transmission slot, and a wireless communication method therefor. This brings about an effect that the time information is taken into consideration when the position information is displayed, so that a relative relationship is secured.

Furthermore, in the first aspect, the transmission slot may be a transmission timing that is different for each wireless communication device in a plurality of the wireless communication devices. Furthermore, the transmission slot may be a combination of a transmission timing and a transmission frequency that are different for each wireless communication device in a plurality of the wireless communication devices.

Furthermore, in the first aspect, a coordinate compression unit that performs compression processing on coordinates of the position information may be further included, and the transmission unit may transmit the transmission data including the position information compressed by the coordinate compression unit and the time information. This brings about an effect of reducing a size of the transmission data.

Furthermore, in the first aspect, the coordinate compression unit may convert the coordinates of the position information to a specific range including a target area to perform the compression processing. In this case, the specific range may be a range to which a rectangular area on a planar map is assigned. Furthermore, the specific range may be a range in which another rectangular area different from the rectangular area on the planar map is assigned to a part of the range.

Furthermore, in the first aspect, a movement vector information generation unit that generates movement vector information of the position information may be included, and the transmission unit may transmit the transmission data further including the movement vector information. This brings about an effect that the movement vector information is further displayed when the position information is displayed. In this case, the movement vector information generation unit may estimate the movement vector information on the basis of movement history of the position information.

Furthermore, a second aspect of the present technology is an information processing device including: a storage unit that stores position information of a plurality of wireless communication devices and time information when the position information is acquired, in association with each other; and a display control unit that causes the position information whose time information indicates same time to be displayed for each wireless communication device at a same timing, and a display control method therefor. As a result, the position information is displayed in consideration of the time information, so that the relative relationship is secured.

Effects of the Invention

According to the present technology, it is possible to obtain an excellent effect that a relative relationship can be secured when position information is displayed. Note that the effect described here is not necessarily limited, and may be any effects described in the present disclosure.

MODE FOR CARRYING OUT THE INVENTION

Hereinafter, modes for implementing the present technology (hereinafter, referred to as embodiments) will be described. The description will be made in the following order.

1. First Embodiment (example of transmitting position information together with acquisition time thereof)
2. Second Embodiment (example of further transmitting estimated moving direction)

1. First Embodiment

[Configuration of Position Display System]

Figure 1:
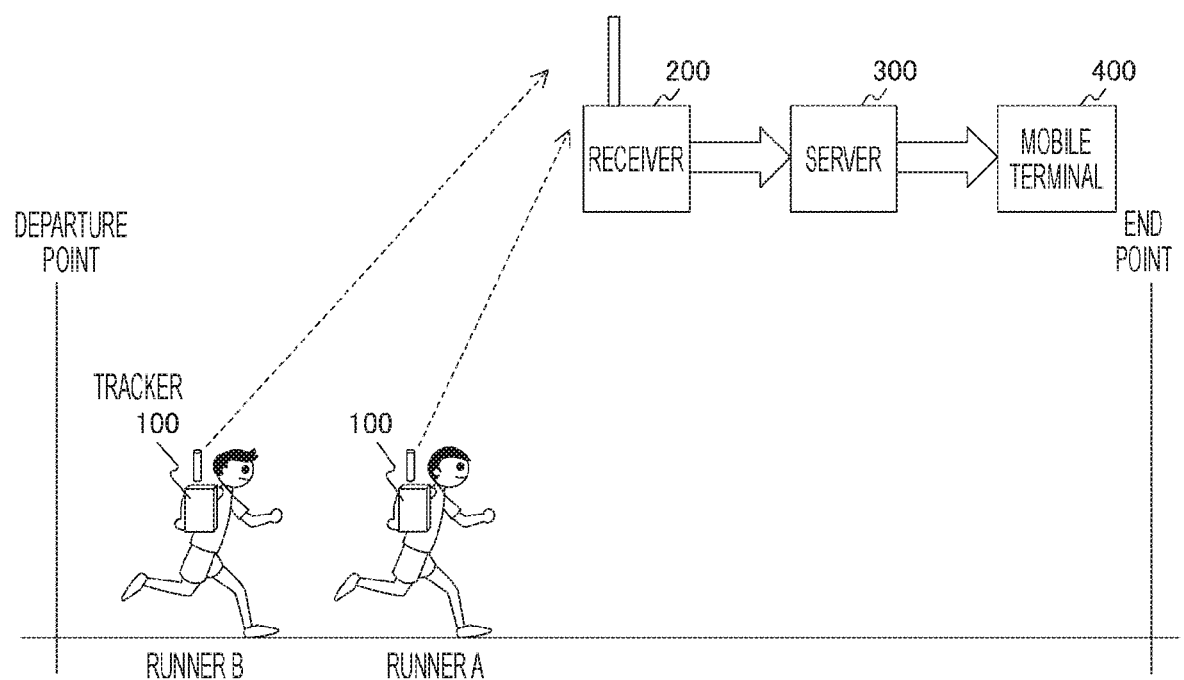
FIG. 1 is a diagram illustrating an example of an overall configuration of a position display system according to embodiments of the present technology.

FIG. 1 is a diagram illustrating an example of an overall configuration of a position display system according to the embodiments of the present technology.

The position display system is a system that displays a position of each runner in a match in which a plurality of runners (competitors) simultaneously starts from a departure (start) point and races toward an end (goal) point. It is assumed that the position display system includes trackers 100, a receiver 200, a server 300, and a mobile terminal 400. Note that, in this example, two runners A and B are shown for simplicity, but it can be assumed that there are a larger number of runners.

Each runner wears one of the trackers 100 for tracking. The tracker 100 acquires position information of the tracker 100 by receiving a GPS signal. The tracker 100 then transmits the acquired position information.

The receiver 200 receives the position information transmitted from each of the trackers 100. The receiver 200 supplies the received position information to the server 300.

The server 300 stores the position information of the trackers 100 supplied from the receiver 200. The server 300 then supplies the position information of the trackers 100 to the mobile terminal 400 in response to a request from the mobile terminal 400.

The mobile terminal 400 is a user terminal for displaying the position of each runner. The mobile terminal 400 requests acquisition of the position information from the server 300. When receiving the position information in response to this, the mobile terminal 400 displays the position of each runner on the basis of the position information.

[Configuration of Tracker]

Figure 2:
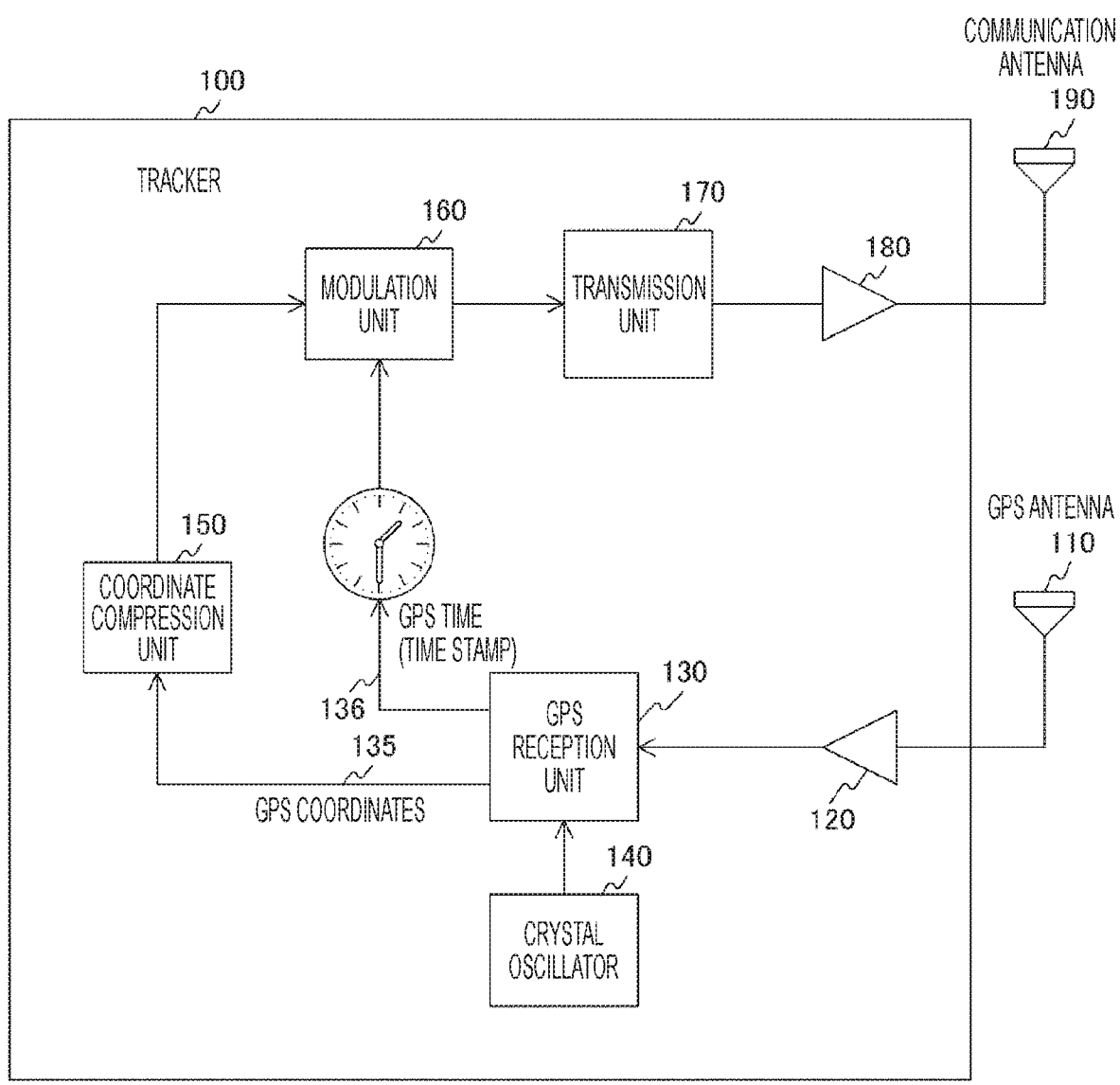
FIG. 2 is a diagram illustrating an example of a configuration of each of trackers 100 according to a first embodiment of the present technology.

FIG. 2 is a diagram illustrating an example of a configuration of each of the trackers 100 according to the first embodiment of the present technology.

The tracker 100 includes a GPS antenna 110, a low noise amplifier 120, a GPS reception unit 130, a crystal oscillator 140, a coordinate compression unit 150, a modulation unit 160, a transmission unit 170, a high efficiency amplifier 180, and a communication antenna 190. Note that the tracker 100 is an example of a wireless communication device described in the claims.

The GPS antenna 110 is an antenna for receiving a GPS signal from a GPS satellite.

The low noise amplifier 120 receives the GPS signal via the GPS antenna 110 and amplifies the GPS signal.

The GPS reception unit 130 performs analog processing on the GPS signal amplified by the low noise amplifier 120 to extract GPS coordinates and GPS time. Note that the GPS reception unit 130 is an example of a position information acquisition unit described in the claims.

The crystal oscillator 140 is a reference oscillator for operating the GPS reception unit 130.

The coordinate compression unit 150 compresses the GPS coordinates extracted by the GPS reception unit 130. The compression processing in the coordinate compression unit 150 will be described later.

The modulation unit 160 modulates the GPS coordinates on which the compression processing is performed by the coordinate compression unit 150 and the GPS time extracted by the GPS reception unit 130 as transmission data including the GPS coordinates and the GPS time.

The transmission unit 170 performs analog processing on the transmission data modulated by the modulation unit 160 to generate a transmission signal.

The high efficiency amplifier 180 amplifies the transmission signal from the transmission unit 170 and transmits the amplified transmission signal as a wireless signal via the communication antenna 190. Here, it is assumed that the wireless signal is transmitted in the 920 MHz band.

The communication antenna 190 is an antenna for transmitting the wireless signal output from the high efficiency amplifier 180 to the outside.

[Configuration of Receiver]

Figure 3:
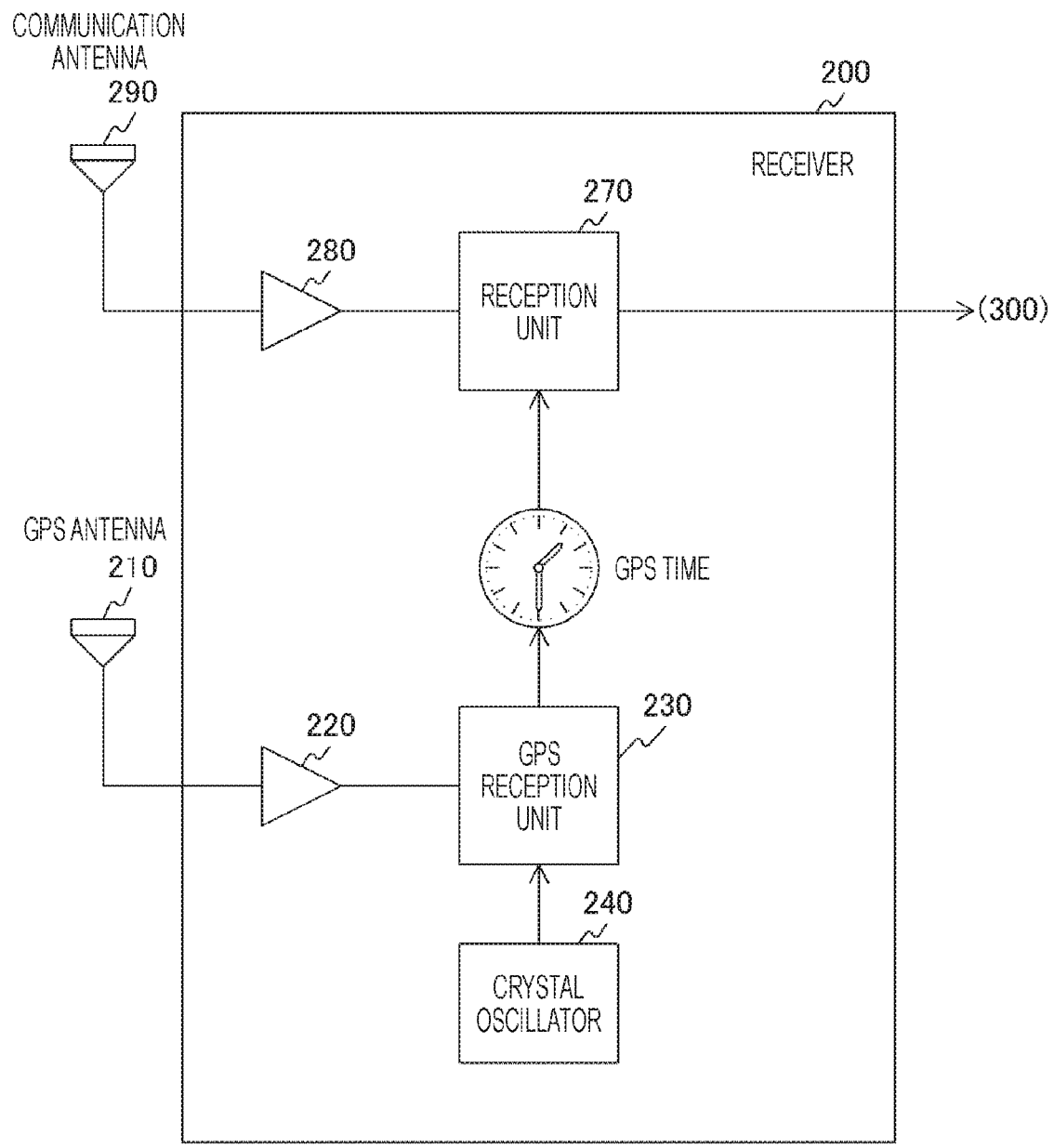
FIG. 3 is a diagram illustrating an example of a configuration of a receiver 200 according to the embodiments of the present technology.

FIG. 3 is a diagram illustrating an example of a configuration of the receiver 200 according to the embodiments of the present technology.

The receiver 200 includes a GPS antenna 210, a low noise amplifier 220, a GPS reception unit 230, a crystal oscillator 240, a reception unit 270, a low noise amplifier 280, and a communication antenna 290. Here, the GPS antenna 210, the low noise amplifier 220, the GPS reception unit 230, and the crystal oscillator 240 are similar to those described for the above-described tracker 100, and thus detailed description thereof will be omitted.

The communication antenna 290 is an antenna for receiving transmission signals from the trackers 100.

The low noise amplifier 280 receives the transmission signals via the communication antenna 290 and amplifies the transmission signals.

The reception unit 270 performs analog processing on the transmission signals amplified by the low noise amplifier 280 and extracts transmission data. Note that, in this example, GPS time extracted by the GPS reception unit 230 is referred to in order to improve the signal accuracy of the reception.

[Transmission Slot]

Figure 4:
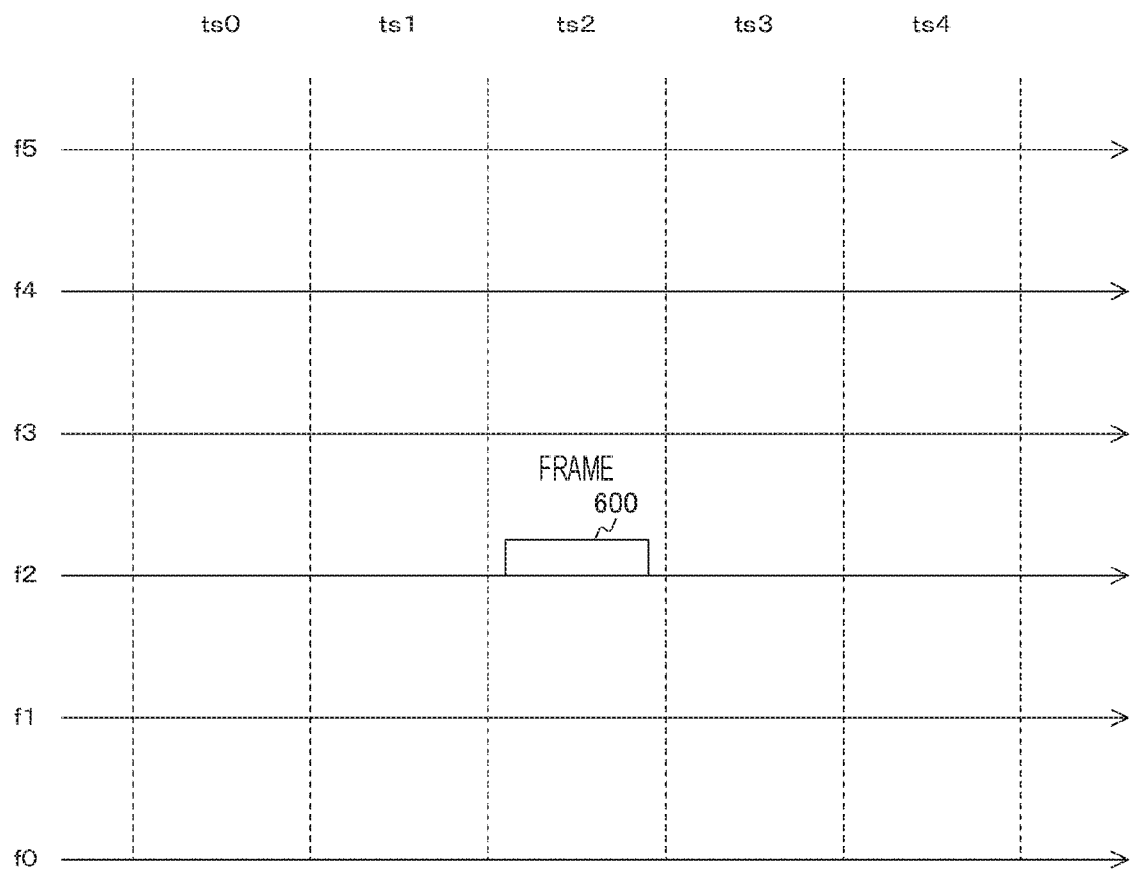
FIG. 4 is a diagram illustrating an example of a transmission slot of wireless communication performed between the trackers 100 and the receiver 200 according to the embodiments of the present technology.

FIG. 4 is a diagram illustrating an example of a transmission slot of wireless communication performed between the trackers 100 and the receiver 200 according to the embodiments of the present technology.

In this example, it is assumed that a combination of a frequency channel and a time slot is used as the transmission slot. In FIG. 4, time is shown in a horizontal direction and a frequency is shown in a vertical direction. It is assumed that six frequency channels f0 to f5 are used as the frequency. Furthermore, it is assumed that five time slots ts0 to ts4 are used as the time.

The frequency channels and time slots are determined for each of the trackers 100 and a frame 600 is transmitted. Each of the trackers 100 receives GPS time at the GPS reception unit 130, and the trackers 100 are synchronized with each other. As a result, for example, each of the trackers 100 can determine the frequency channel and the time slot by using a bit field included as an identifier of the tracker 100.

That is, the transmission slot is ideally distributed to a number obtained by multiplying the number of frequency channels and the number of time slots. Different trackers 100 may use the same frequency channel and time slot, but even in this case, it is still possible to detect each of the different trackers 100 by using different preambles. Furthermore, by performing error correction, it is possible to receive a signal to some extent even if reception sensitivity is lowered due to a collision. As a further advanced configuration example, a pseudo random number may be generated by use of a predetermined mathematical expression in accordance with GPS time and a unique number of a tracker, and the frequency channel may be switched by the pseudo random number. With this configuration, the frequency channel changes momentarily in accordance with the unique number the tracker, so that even in a case where a collision occurs at a certain timing, possibility of avoiding the collision at the next transmission timing increases.

[Transmission Data]

Figure 5:
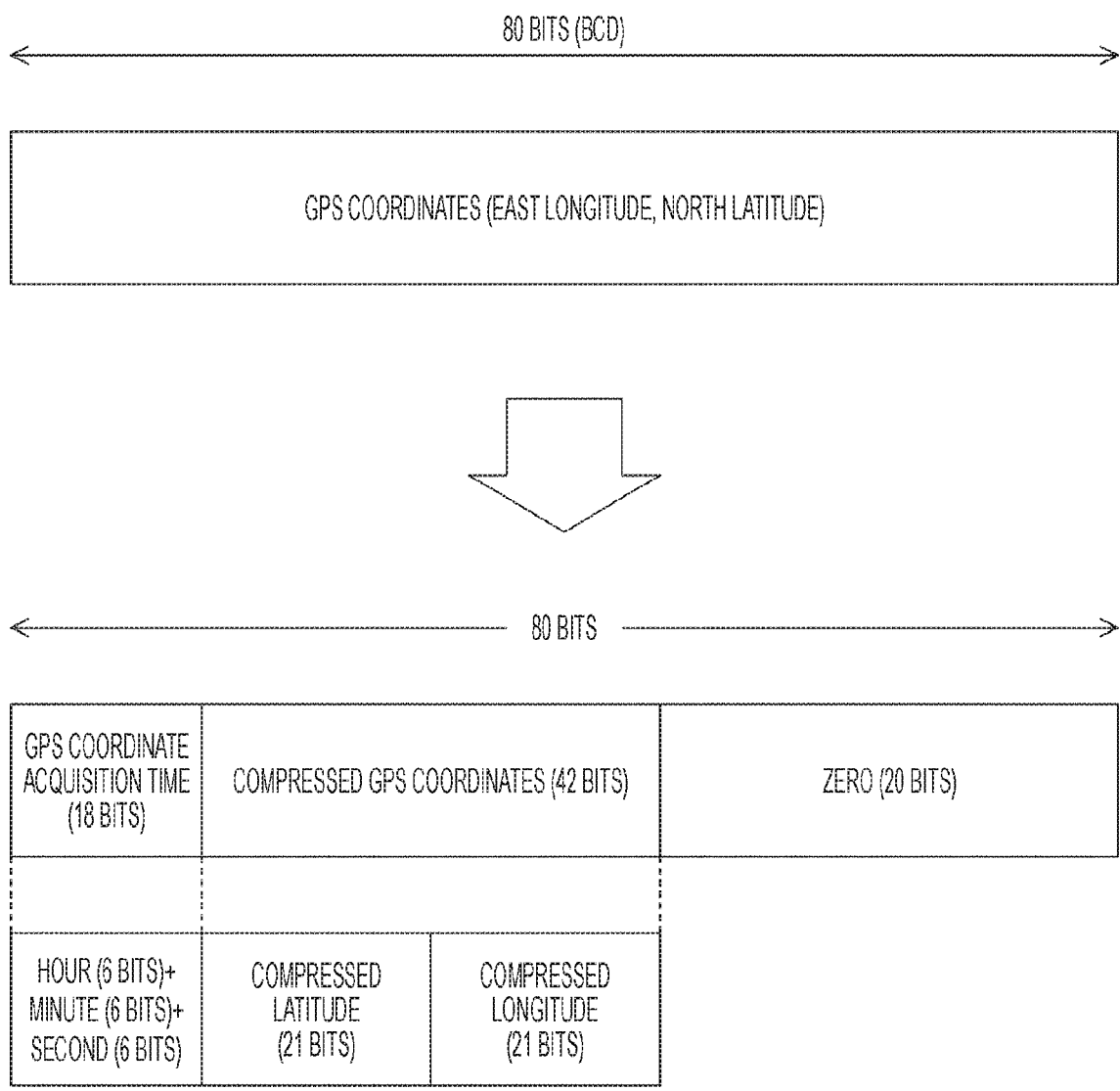
FIG. 5 is a diagram illustrating a field configuration example of transmission data according to the first embodiment of the present technology.

FIG. 5 is a diagram illustrating a field configuration example of transmission data according to the first embodiment of the present technology.

GPS coordinates are usually expressed by latitude and longitude, and have 80 bits in total in a binary coded decimal (BCD) format. For example, "35.681152 degrees east longitude, 139.766692 degrees north latitude" is "E035.681152, N139.766692", which is 20 characters excluding symbol parts. Since four bits are assigned for each character in the BCD format, the GPS coordinates have 80 bits in total.

Meanwhile, in this embodiment, the latitude and the longitude are each compressed to 21 bits to make compressed GPS coordinates of 42 bits in total. Furthermore, in this embodiment, time at which the GPS coordinates are acquired is transmitted as transmission data. This acquisition time has 18 bits in total if six bits are assigned to each of hour, minute, and second. Therefore, even if the GPS acquisition time is included, required bits are 60 bits.

Note that the GPS acquisition time is time at which the GPS coordinates are acquired, and is not time at which the transmission unit 170 actually performs transmission.

[Coordinate Compression]

Figure 6:
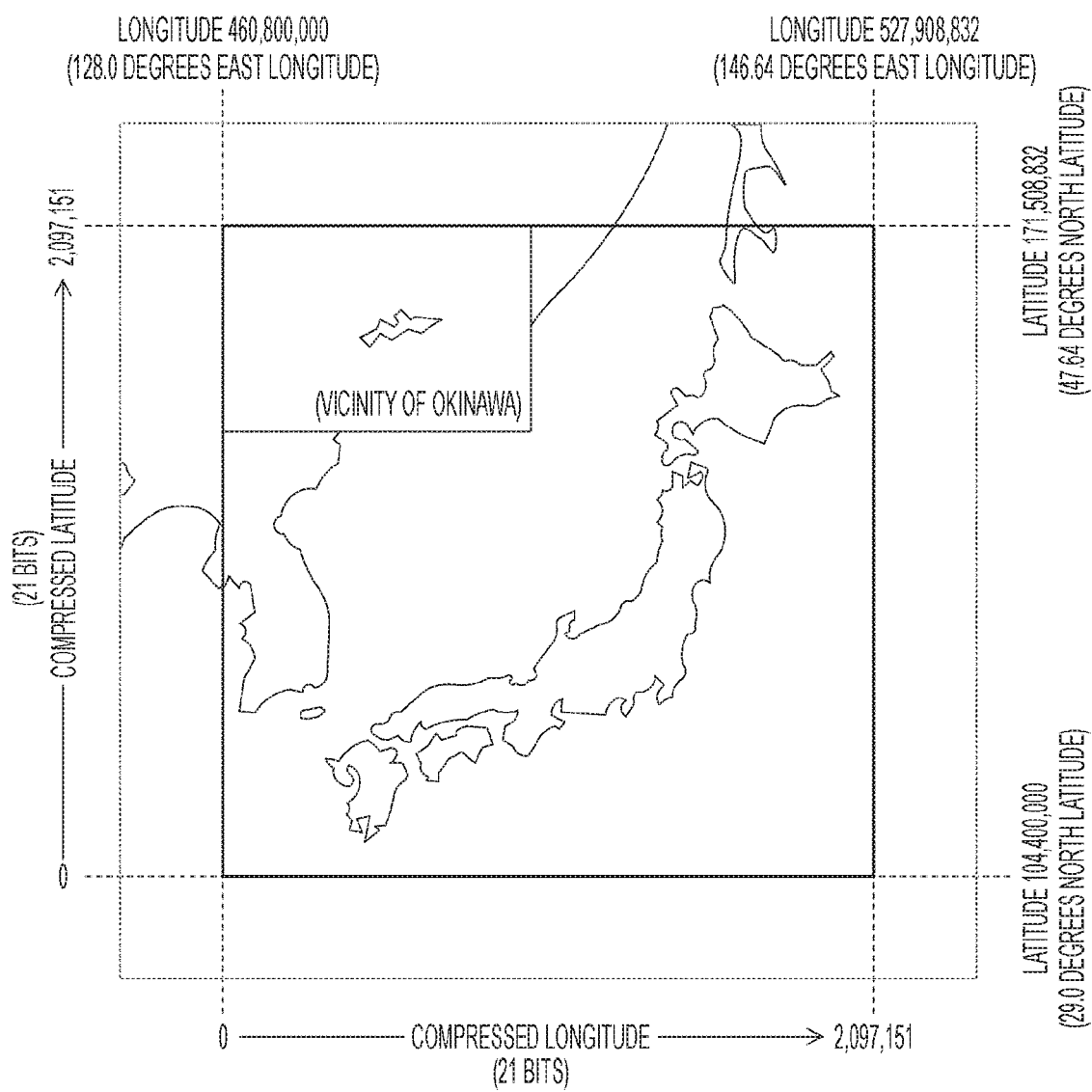
FIG. 6 is a diagram illustrating an example of compression processing of GPS coordinates according to the embodiments of the present technology.

FIG. 6 is a diagram illustrating an example of the compression processing of GPS coordinates according to the embodiments of the present technology.

In this embodiment, a millisecond format is used as an expression format of the latitude and the longitude. An actual distance equivalent to "one degree" is about 111 Km, and an actual distance equivalent to "one minute" is about 1.85 Km. In addition, an actual distance equivalent to "one second" is about 30.86 m. Therefore, an actual distance equivalent to "one millisecond" is about 3.086 cm.

Furthermore, in this embodiment, lower five bits of the latitude and the longitude expressed in the millisecond format are discarded. In this case, the accuracy of the distance is about 1 m, and it is considered that such accuracy is sufficient as the display accuracy of the position display system.

Furthermore, in this embodiment, a target area is limited. That is, the position display system does not necessarily need to distinguish positions of the entire world at the same time because it is assumed that a competition is held in a specific country or region. In this example, a case is shown where the target area is limited by being set to Japan and positions are specified.

Most of the region of Japan is included in a rectangular area on a map, which is bounded by 29.0 to 47.64 degrees north latitude and 128.0 to 146.64 degrees east longitude. Expressed in the millisecond format, this is a range of latitude 104,400,000 to 171,508,832 and longitude 460,800,000 to 527,908,832.

Therefore, coordinates are expressed with an origin (0, 0) at 29.00 degrees north latitude and 128.00 degrees east longitude. That is, the coordinates are decomposed into relative coordinates (data) and offset (fixed value). In this case, if the lower five bits are discarded, the latitude is 0 to 2,097,151 and the longitude is 0 to 2,097,151, each of which can be expressed by 21 bits as described above.

However, this rectangular area does not include the Okinawa Islands. Therefore, for the vicinity of the Okinawa Islands, another rectangular area is secured and coordinates are assigned to an upper left part. In this case, coordinates that have been assigned to another country in the original rectangular area are assigned to another new rectangular area.

[Configuration of Mobile Terminal]

Figure 7:
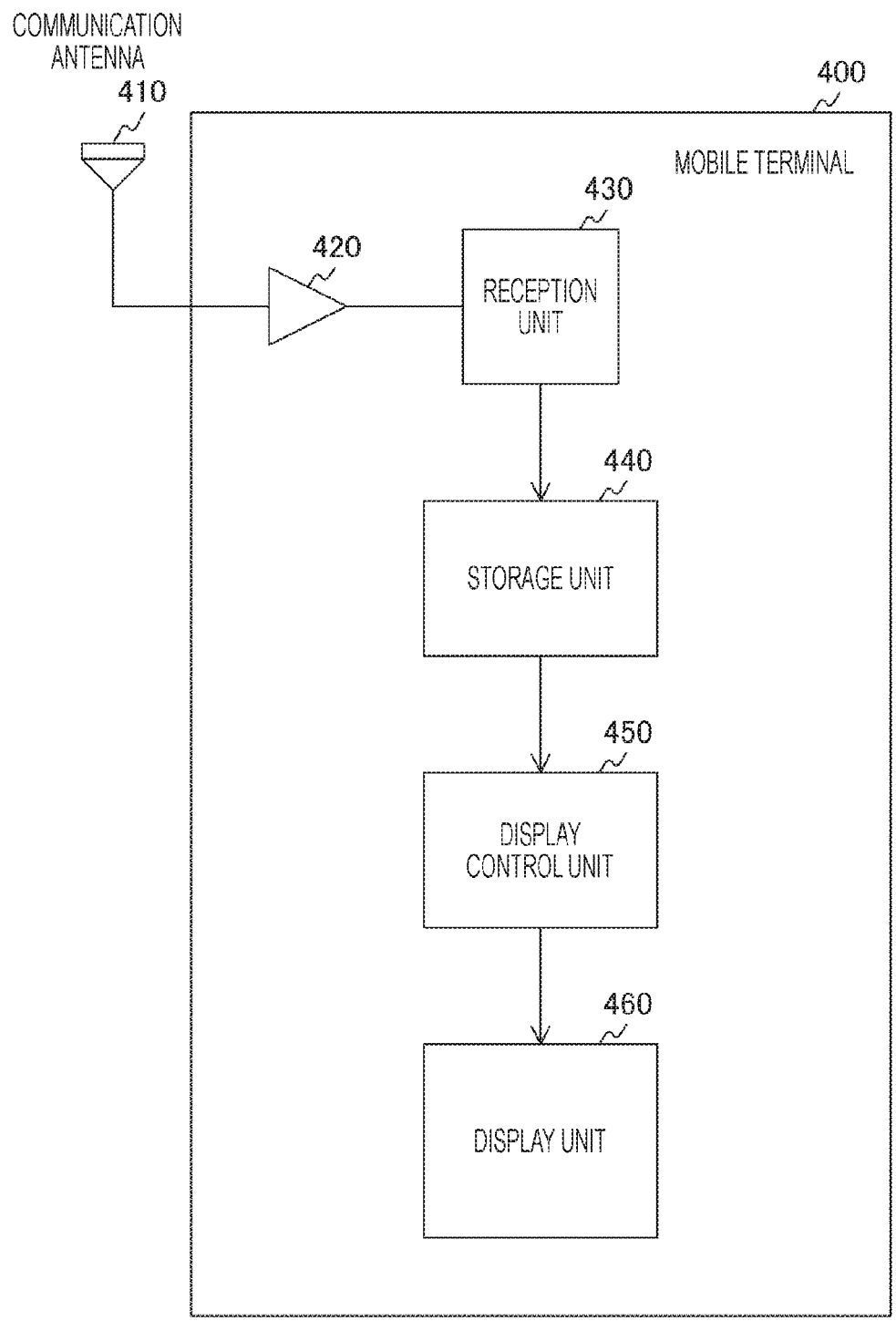
FIG. 7 is a diagram illustrating an example of a configuration of a mobile terminal 400 according to the embodiments of the present technology.

FIG. 7 is a diagram illustrating an example of a configuration of the mobile terminal 400 according to the embodiments of the present technology.

The mobile terminal 400 includes a communication antenna 410, a low noise amplifier 420, a reception unit 430, a storage unit 440, a display control unit 450, and a display unit 460. Note that the mobile terminal 400 is an example of an information processing device described in the claims.

The communication antenna 410 is an antenna for receiving a transmission signal from the server 300.

The low noise amplifier 420 receives the transmission signal from the server 300 via the communication antenna 410 and amplifies the transmission signal.

The reception unit 430 performs analog processing on the transmission signal amplified by the low noise amplifier 420 and extracts transmission data from the server 300.

The storage unit 440 stores, in association with each other, position information of the trackers 100 and the acquisition time thereof included in the transmission data from the server 300 extracted by the reception unit 430.

The display control unit 450 causes the display unit 460 to display, at the same timing, the position information of the trackers 100 indicating the same acquisition time.

The display unit 460 displays the position information of each of the plurality of trackers 100 under control of the display control unit 450.

[Display of Position Information]

Figure 8:
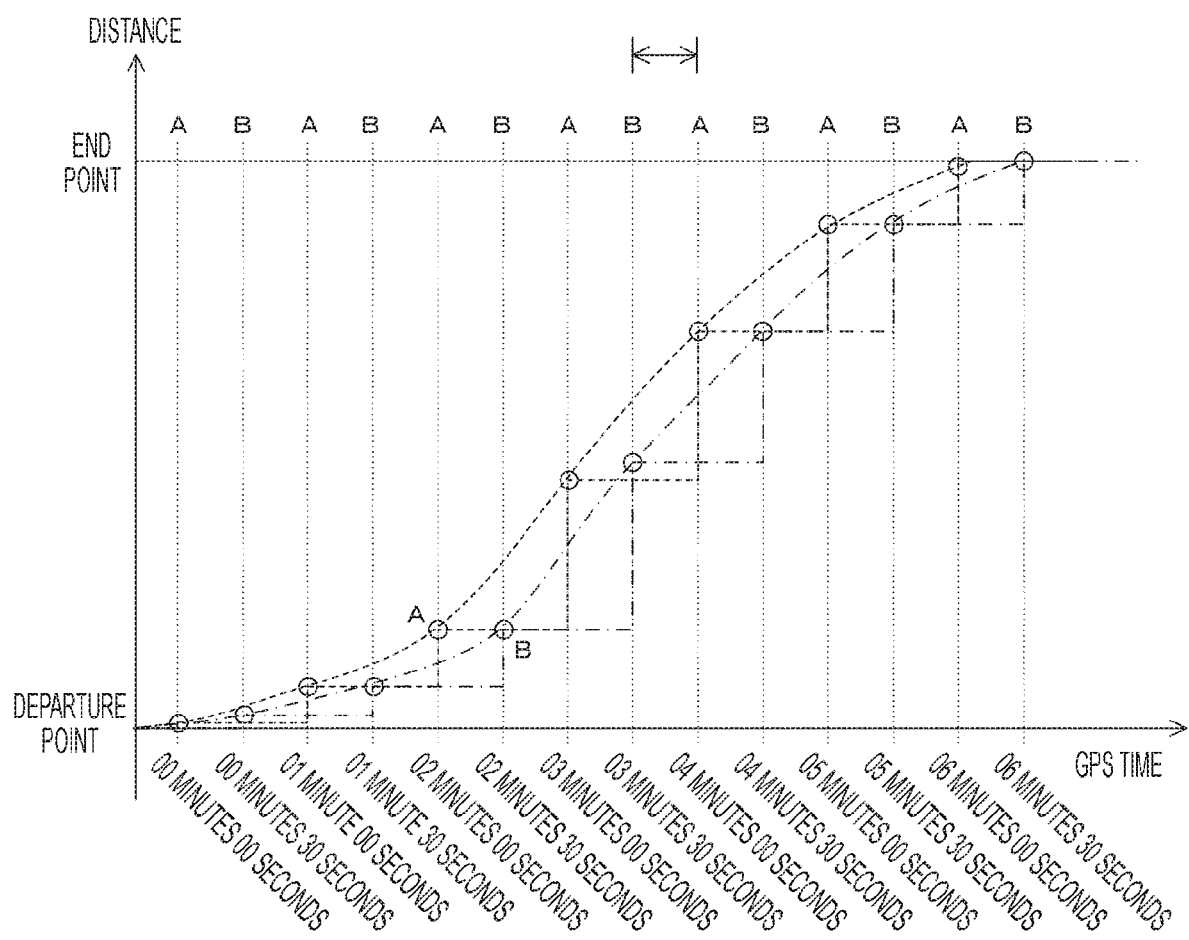
FIG. 8 is a diagram illustrating an example of a case where position information transmitted from the plurality of trackers is displayed as it is.

FIG. 8 is a diagram illustrating an example of a case where the position information transmitted from the plurality of trackers is displayed as it is. In this example, an example of a case is shown where transmission from a tracker of runner A and transmission from a tracker of runner B are alternately performed every 30 seconds. A curved line is an actual runner position and a straight line is a displayed position. A broken line shows the runner A, and a one-dot chain line shows the runner B. Since it is assumed that the transmission is performed at one minute intervals, there is a time lag between the actual position and the displayed position.

In this example, the acquisition time of the position information is not taken into consideration, and the transmitted position information is displayed as it is. Therefore, on the display, display is performed as if the runner B is running ahead of the runner A in a section from 3 minutes 30 seconds to 4 minutes 0 seconds. However, actually, the runner A is always running ahead of the runner B. When position display in a race event is performed, it is necessary to avoid displaying such an overtaking that does not actually occur. Therefore, in the embodiments of the present technology, the display is performed in consideration of the acquisition time of the position information as follows.

Figure 9:
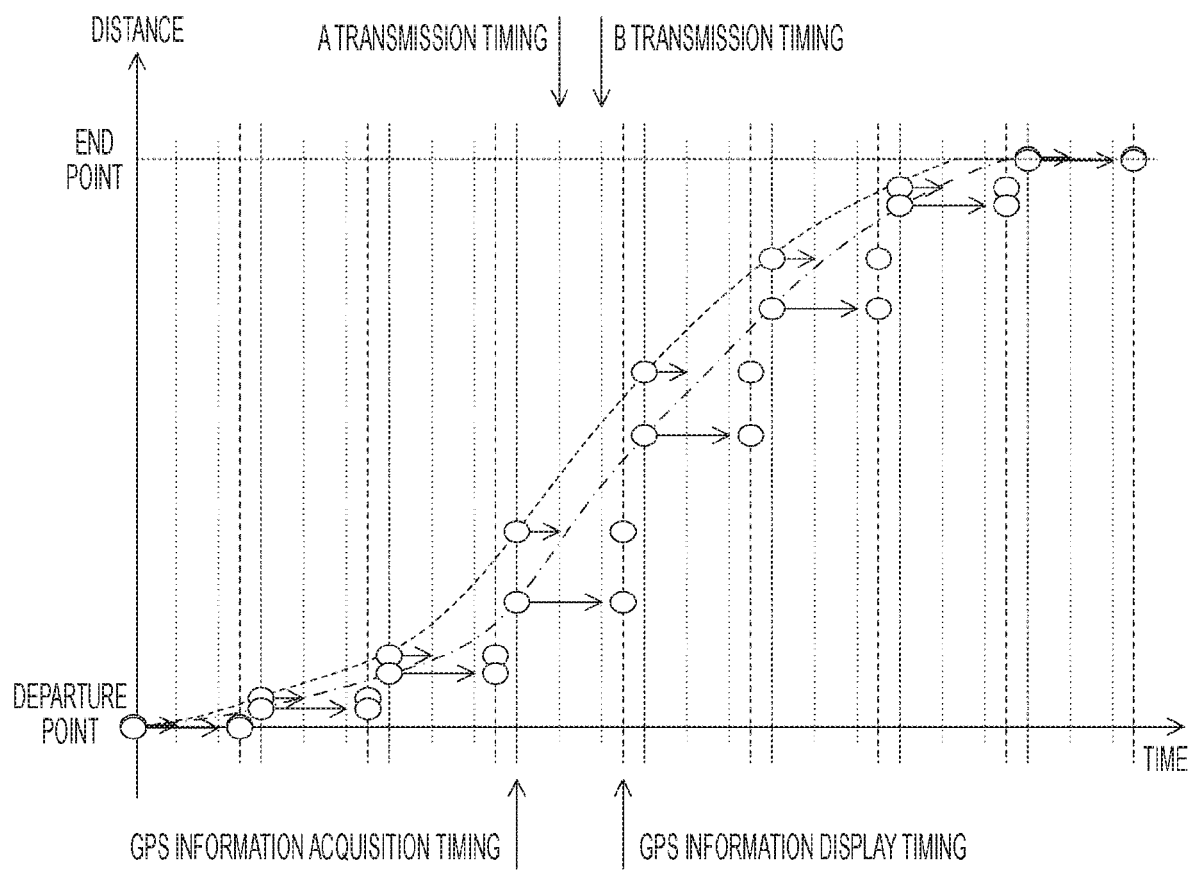
FIG. 9 is a diagram illustrating a display example of the position information according to the first embodiment of the present technology.

FIG. 9 is a diagram illustrating a display example of the position information according to the first embodiment of the present technology.

In this example, transmission timings from the trackers 100 of the runner A and the runner B are set to be different from each other. Meanwhile, acquisition timings of the GPS coordinates by the trackers 100 are common to both. At this time, when the position information is displayed on the mobile terminal 400, the acquisition time of the GPS coordinates is taken into consideration and the position information having the same acquisition time is displayed at the same timing. As described above, by taking the acquisition time of the GPS coordinates into consideration when the position information is displayed, it is possible to secure a relative relationship without displaying an overtaking that has not actually occurred.

[Operation]

Figure 10:
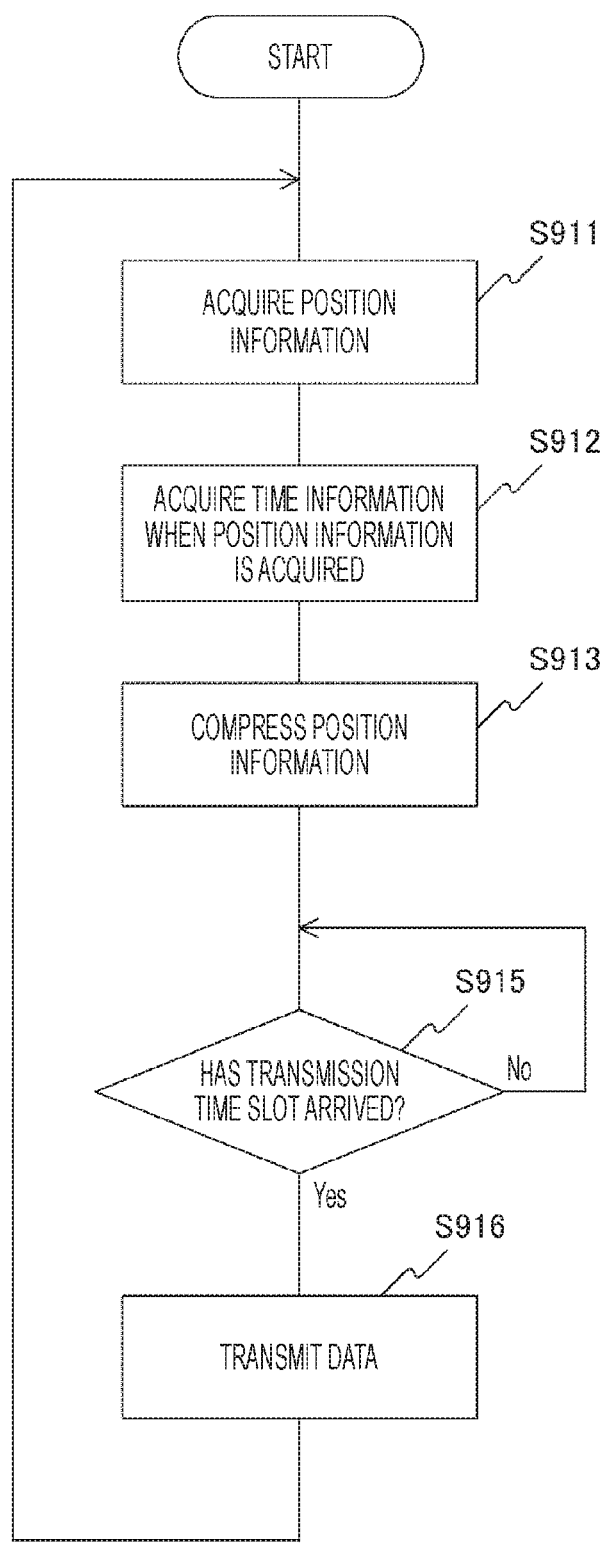
FIG. 10 is a diagram illustrating an example of a processing procedure of each of the trackers 100 according to the first embodiment of the present technology.

FIG. 10 is a diagram illustrating an example of a processing procedure of each of the trackers 100 according to the first embodiment of the present technology.

The GPS reception unit 130 acquires the position information of the tracker 100 (step S911). Furthermore, the GPS reception unit 130 acquires time information when the position information is acquired (step S912). The coordinate compression unit 150 then performs compression processing on the acquired position information (step S913).

After that, when a transmission time slot assigned to the tracker 100 arrives (Yes in step S915), the transmission unit 170 transmits transmission data including the compressed GPS coordinates and the GPS coordinate acquisition time by the above-described field configuration (step S916).

Figure 11:
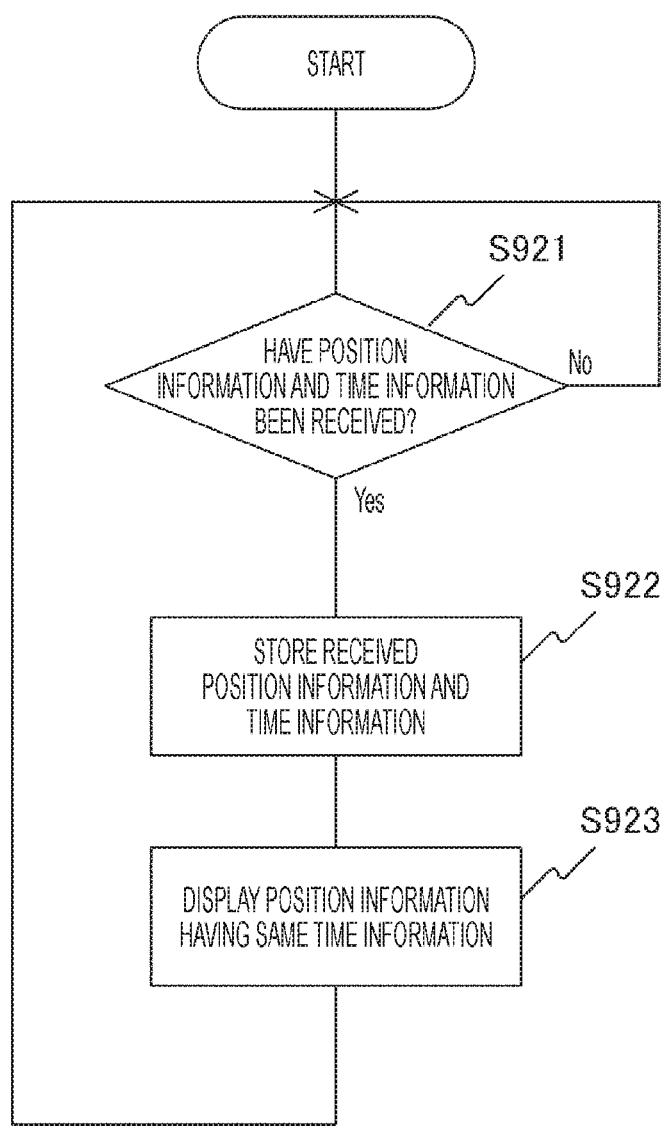
FIG. 11 is a diagram illustrating an example of a processing procedure of the mobile terminal 400 according to the first embodiment of the present technology.

FIG. 11 is a diagram illustrating an example of a processing procedure of the mobile terminal 400 according to the first embodiment of the present technology.

When the reception unit 430 receives, from the server 300, transmission data including the position information and the acquisition time thereof (Yes in step S921), the received position information and acquisition time are associated and stored in the storage unit 440 (step S922). The display control unit 450 then causes the display unit 460 to display, at the same timing, the position information of the trackers 100 indicating the same acquisition time (step S923).

As described above, in the first embodiment of the present technology, the position information of the trackers 100 and the acquisition time of the position information are transmitted. As a result, the position information can be displayed on the mobile terminal 400 in consideration of the acquisition time of the position information, and the relative relationship among the plurality of trackers 100 (runners) can be secured.

2. Second Embodiment

In the above-described first embodiment, the position information is displayed in consideration of the acquisition time of the position information, so that the relative relationship among the plurality of trackers 100 is secured. However, in a case where transmission intervals of the plurality of trackers 100 are long, the displayed position information may be old and deviate from the actual position. Therefore, in this second embodiment, it is possible to perform the display in which the displayed position is closer to the actual position, by estimating moving directions of trackers 100.

Note that an overall configuration of a position display system is similar to that of the above-described first embodiment, and thus detailed description thereof will be omitted.

[Configuration of Tracker]

Figure 12:
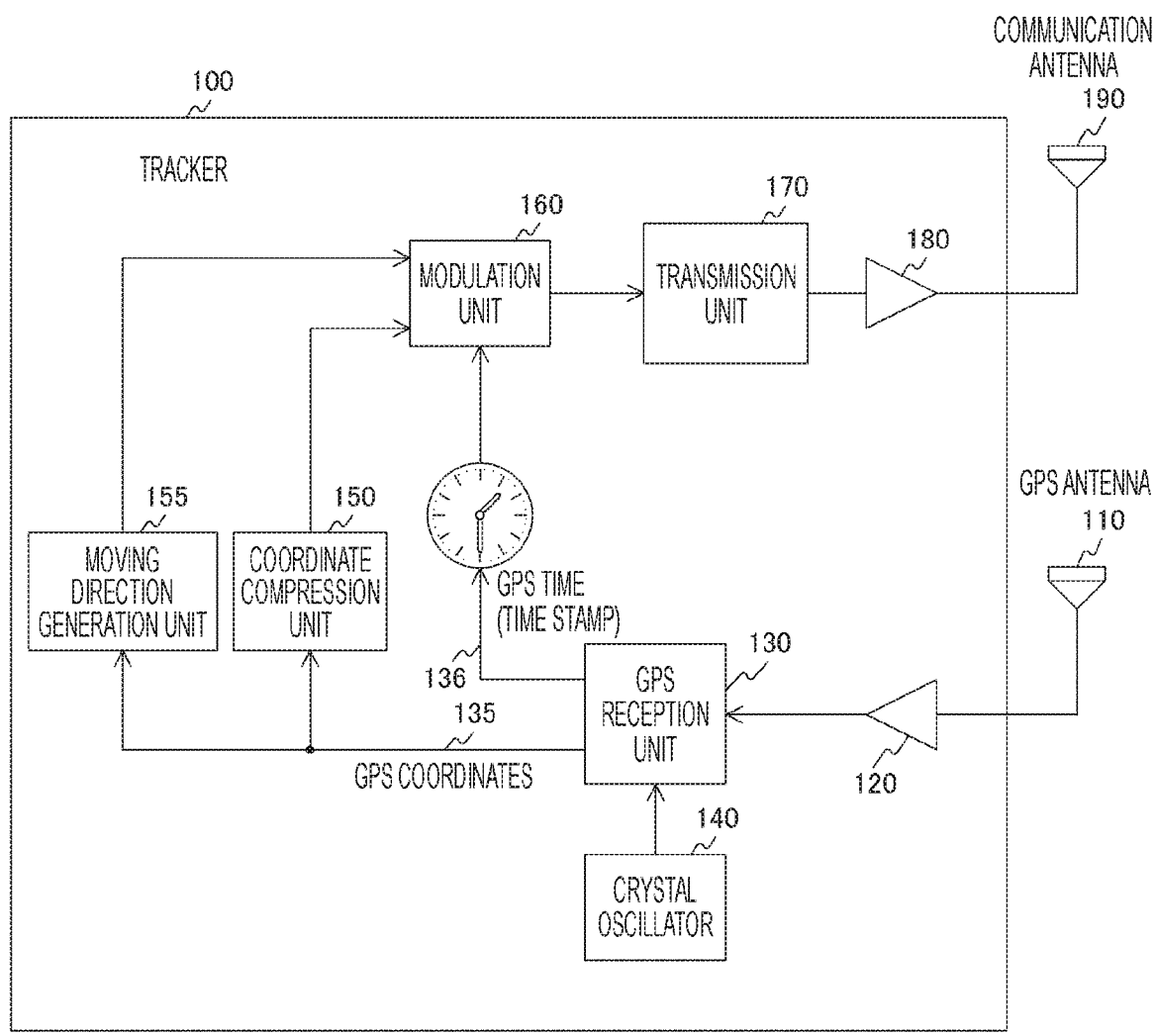
FIG. 12 is a diagram illustrating an example of a configuration of each of trackers 100 according to a second embodiment of the present technology.

FIG. 12 is a diagram illustrating an example of a configuration of each of the trackers 100 according to the second embodiment of the present technology.

The tracker 100 according to the second embodiment has a configuration similar to the tracker 100 according to the above-described first embodiment, and further includes a moving direction generation unit 155.

The moving direction generation unit 155 generates a moving direction of the tracker 100. The moving direction generation unit 155 estimates the moving direction of the tracker 100, for example, on the basis of transition of GPS coordinates as movement history. The moving direction generated by the moving direction generation unit 155 is transmitted by a transmission unit 170 as transmission data together with position information and acquisition time. Note that the moving direction generation unit 155 is an example of a movement vector information generation unit described in the claims.

[Transmission Data]

Figure 13:
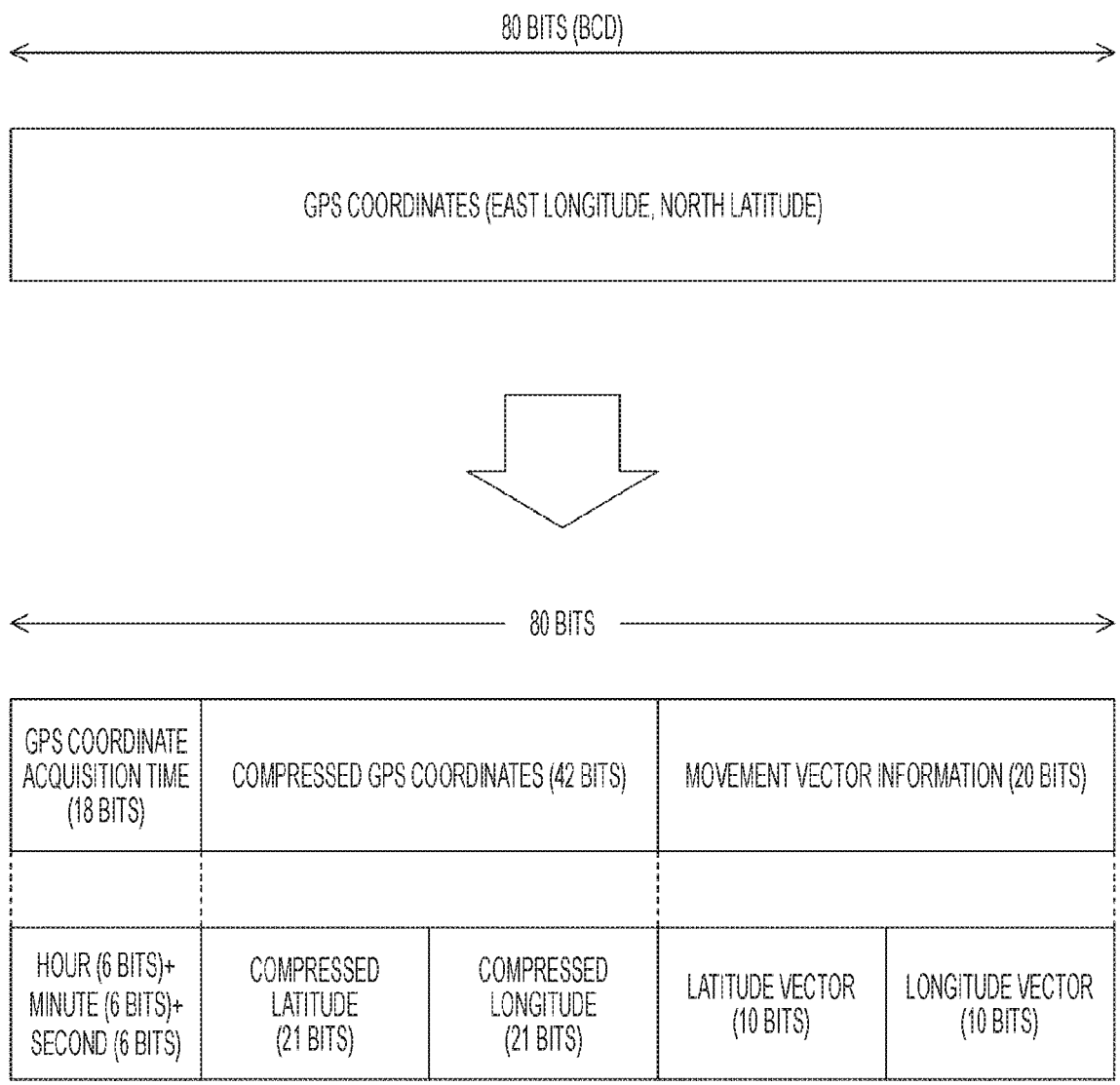
FIG. 13 is a diagram illustrating a field configuration example of transmission data according to the second embodiment of the present technology.

FIG. 13 is a diagram illustrating a field configuration example of transmission data according to the second embodiment of the present technology.

In the above-described first embodiment, 60 bits out of 80 bits are used, but in the second embodiment, the moving direction is transmitted by remaining 20 bits. That is, a latitude vector of 10 bits is provided as a movement vector in a latitude direction, a longitude vector of 10 bits is provided as a movement vector in a longitude direction, and both are combined into movement vector information of 20 bits.

As a result, transmission data of 80 bits in total including GPS coordinate acquisition time of 18-bits, compressed GPS coordinates of 42 bits, and the movement vector information of 20 bits is transmitted from the transmission unit 170. These pieces of information are stored in a server 300 via a receiver 200. The server 300 then supplies these pieces of information to a mobile terminal 400 in response to a request from the mobile terminal 400. The mobile terminal 400 displays the position information in consideration of the acquisition time, and displays estimated position information in consideration of the moving direction at a timing between position displays based on the position information.

[Display of Position Information]

Figure 14:
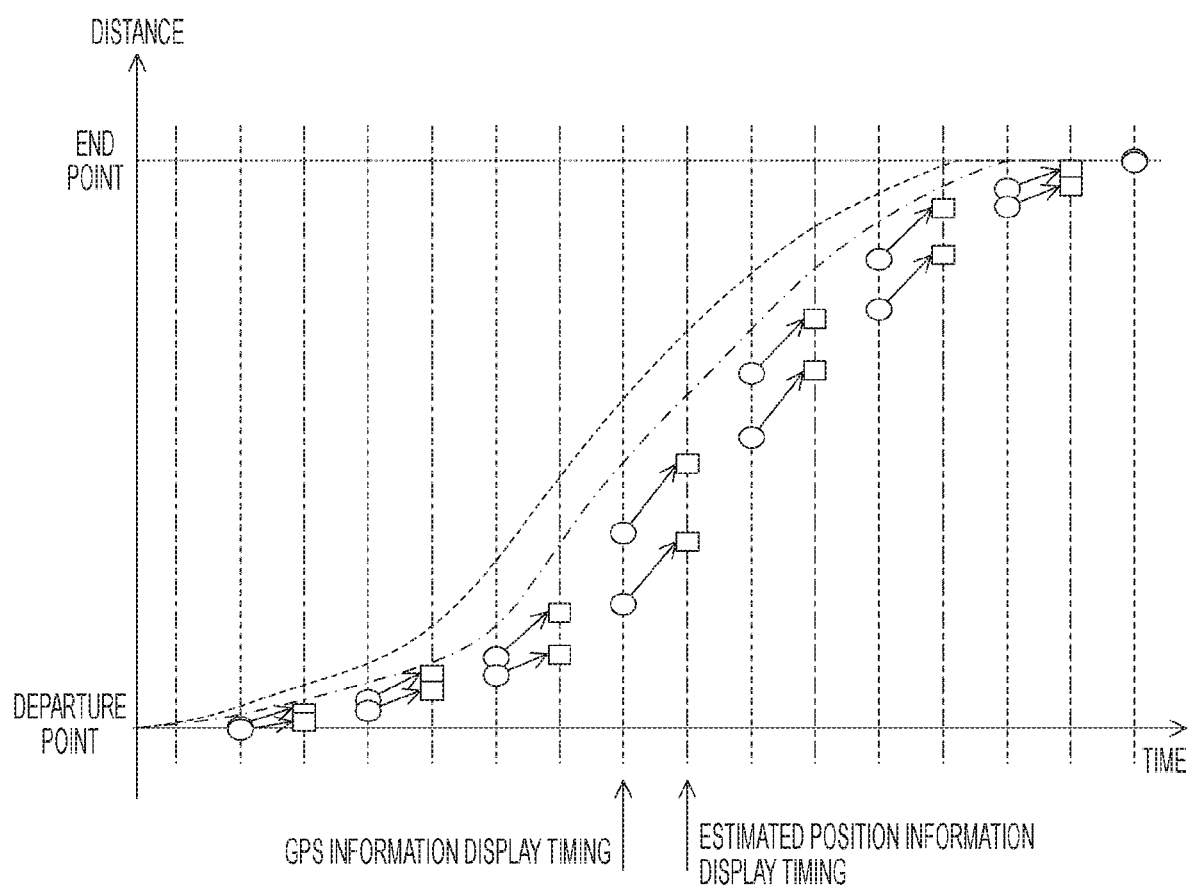
FIG. 14 is a diagram illustrating a display example of position information according to the second embodiment of the present technology.

FIG. 14 is a diagram illustrating a display example of the position information according to the second embodiment of the present technology.

In this example, similarly to the above-described first embodiment, positions of trackers 100 of a runner A and a runner B are shown.

In the second embodiment, in addition to the position display based on the position information transmitted from the trackers 100, the estimated position information in consideration of the moving direction is displayed. As a result, it is possible to estimate and display positions closer to actual positions of the trackers 100 at the timing between the position displays based on the position information.

[Operation]

Figure 15:
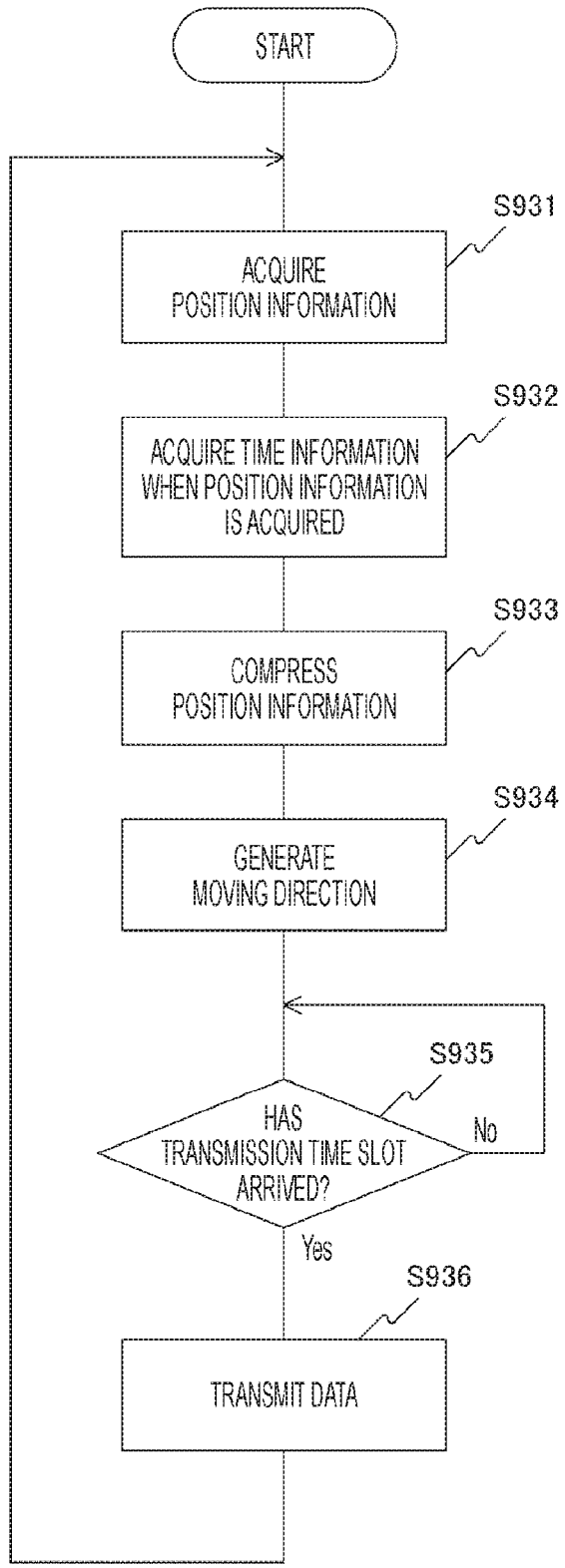
FIG. 15 is a diagram illustrating an example of a processing procedure of each of the trackers 100 according to the second embodiment of the present technology.

FIG. 15 is a diagram illustrating an example of a processing procedure of each of the trackers 100 according to the second embodiment of the present technology.

Steps S931 to S933, S935, and S936 of the second embodiment are similar to steps S911 to S913, S915, and S916 of the above-described first embodiment.

In the second embodiment, the moving direction is further generated (step S934). After that, when a transmission time slot assigned to the tracker 100 arrives (Yes in step S935), the transmission unit 170 transmits transmission data including the compressed GPS coordinates, the GPS coordinate acquisition time, and the movement vector information (moving direction) by the above-described field configuration (step S936). The movement vector information can be detected as a moving speed from a GPS reception unit 130. Alternatively, the movement vector information can be obtained as a difference from the past position information.

Figure 16:
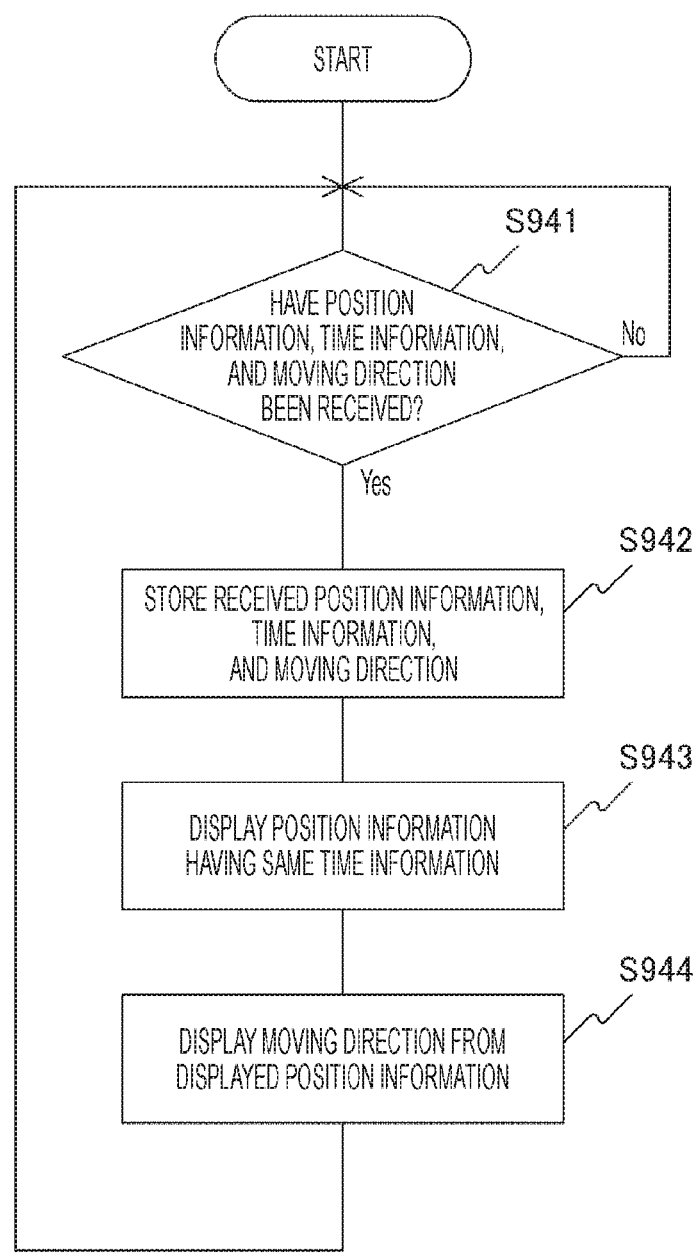
FIG. 16 is a diagram illustrating an example of a processing procedure of a mobile terminal 400 according to the second embodiment of the present technology.

FIG. 16 is a diagram illustrating an example of a processing procedure of the mobile terminal 400 according to the second embodiment of the present technology.

Steps S941 to S943 of the second embodiment are basically similar to steps S921 to S923 of the above-described first embodiment. However, transmission data from the server 300 further includes the moving direction. A display control unit 450 causes a display unit 460 to display estimated positions in consideration of moving directions and moving speeds of the trackers 100 indicating the same acquisition time (step S944).

As described above, in the second embodiment of the present technology, the information regarding the moving directions and the moving speeds is transmitted together with the position information and the acquisition time of the trackers 100. As a result, the estimated positions can be displayed on the mobile terminal 400.

Note that the above-described embodiments are examples for embodying the present technology, and matters in the embodiments and matters specifying the invention in the claims have a corresponding relationship. Similarly, the matters specifying the invention in the claims and matters having the same names as those in the embodiments of the present technology have a correspondence relationship. However, the present technology is not limited to the embodiments, and can be embodied by variously modifying the embodiments without departing from the gist thereof.

Furthermore, the processing procedures described in the above-described embodiments may be regarded as a method having a series of these procedures, and moreover, may be regarded as a program for causing a computer to execute the series of these procedures or a recording medium storing the program. As the recording medium, for example, a compact disc (CD), a minidisc (MD), a digital versatile disc (DVD), a memory card, a Blu-ray disc (Blu-ray (registered trademark) disc), or the like can be used.

Note that the effects described in the present specification are merely examples, are not limited, and may have other effects.

Note that the present technology may have the following configurations.

(1) A wireless communication device including:
a position information acquisition unit that acquires position information together with time information of the position information; and a transmission unit that transmits transmission data including the position information and the time information in a predetermined transmission slot.

(2) The wireless communication device according to (1), in which
the transmission slot is a transmission timing that is different for each wireless communication device in a plurality of the wireless communication devices.

(3) The wireless communication device according to (1), in which
the transmission slot is a combination of a transmission timing and a transmission frequency that are different for each wireless communication device in a plurality of the wireless communication devices.

(4) The wireless communication device according to any one of (1) to (3), further including a coordinate compression unit that performs compression processing on coordinates of the position information, in which
the transmission unit transmits the transmission data including the position information compressed by the coordinate compression unit and the time information.

(5) The wireless communication device according to (4), in which
the coordinate compression unit converts the coordinates of the position information to a specific range including a target area to perform the compression processing.

(6) The wireless communication device according to (5), in which
the specific range is a range to which a rectangular area on a planar map is assigned.

(7) The wireless communication device according to (6), in which
the specific range is a range in which another rectangular area different from the rectangular area on the planar map is assigned to a part of the range.

(8) The wireless communication device according to any one of (1) to (7), further including a movement vector information generation unit that generates movement vector information of the position information, in which
the transmission unit transmits the transmission data further including the movement vector information.

(9) The wireless communication device according to (8), in which
the movement vector information generation unit estimates the movement vector information on the basis of movement history of the position information.

(10) A wireless communication method including procedures of:
acquiring, by a position information acquisition unit, position information together with time information of the position information; and
transmitting, by a transmission unit, transmission data including the position information and the time information in a predetermined transmission slot.

(11) An information processing device including:
a storage unit that stores position information of a plurality of wireless communication devices and time information when the position information is acquired, in association with each other; and
a display control unit that causes the position information whose time information indicates same time to be displayed for each wireless communication device at a same timing.

(12) A display control method including procedures of:
storing, by a storage unit, position information of a plurality of wireless communication devices and time information when the position information is acquired, in association with each other; and
causing, by a display control unit, the display unit to display the position information whose time information indicates same time, for each wireless communication device at a same timing.

REFERENCE SIGNS LIST

100 Tracker
110 GPS antenna
120 Low noise amplifier
130 GPS reception unit
140 Crystal oscillator
150 Coordinate compression unit
155 Moving direction generation unit
160 Modulation unit
170 Transmission unit
180 High efficiency amplifier
190 Communication antenna
200 Receiver
210 GPS antenna
220 Low noise amplifier
230 GPS reception unit
240 Crystal oscillator
270 Reception unit
280 Low noise amplifier
290 Communication antenna
300 Server
400 Mobile terminal
410 Communication antenna
420 Low noise amplifier
430 Reception unit
440 Storage unit
450 Display control unit
460 Display unit

The invention claimed is:

1. A wireless communication device, comprising:
a position information acquisition unit configured to acquire position information together with time information at which the position information is acquired; and
a transmission unit configured to transmit transmission data in a determined transmission slot, wherein
the transmission data includes the position information and the time information,
the determined transmission slot is a combination of a transmission timing and a transmission frequency that are different for each wireless communication device of a plurality of wireless communication devices,
a pseudo random number is generated based on the time information and a unique number associated with each wireless communication device of the plurality of wireless communication devices, and
the transmission frequency of each wireless communication device of the plurality of wireless communication devices is switched based on the pseudo random number.

2. The wireless communication device according to claim 1, further comprising
a coordinate compression unit configured to perform compression processing on coordinates of the position information, wherein
the transmission unit is further configured to transmit the transmission data that includes the position information compressed by the coordinate compression unit and the time information.

3. The wireless communication device according to claim 2, wherein
the coordinate compression unit is further configured to convert the coordinates of the position information to a specific range to perform the compression processing, and
the specific range includes a target area.

4. The wireless communication device according to claim 3, wherein the specific range includes a first range to which a first rectangular area on a planar map is assigned.

5. The wireless communication device according to claim 4, wherein the specific range further includes a second range in which a second rectangular area, different from the first rectangular area, on the planar map is assigned to a part of the second range.

6. The wireless communication device according to claim 1, further comprising
a movement vector information generation unit configured to generate movement vector information of the position information, wherein
the transmission unit is further configured to transmit the transmission data that includes the movement vector information.

7. The wireless communication device according to claim 6, wherein
the movement vector information generation unit is further configured to estimate the movement vector information based on a movement history of the position information.

8. A wireless communication method, comprising:
acquiring, by a position information acquisition unit, position information together with time information at which the position information is acquired; and
transmitting, by a transmission unit, transmission data in a determined transmission slot, wherein
the transmission data includes the position information and the time information,
the determined transmission slot is a combination of a transmission timing and a transmission frequency that are different for each wireless communication device of a plurality of wireless communication devices,
a pseudo random number is generated based on the time information and a unique number associated with each wireless communication device of the plurality of wireless communication devices, and
the transmission frequency of each wireless communication device of the plurality of wireless communication devices is switched based on the pseudo random number.

9. An information processing device, comprising:
a communication unit configured to receive transmission data from a server, wherein
the transmission data includes position information of a plurality of wireless communication devices and time information at which the position information of each wireless communication device of the plurality of wireless communication devices is acquired,
the transmission data is transmitted from a wireless communication device of the plurality of wireless communication devices in a determined transmission slot,
the determined transmission slot is a combination of a transmission timing and a transmission frequency that are different for each wireless communication device of the plurality of wireless communication devices,
the transmission frequency of each wireless communication device of the plurality of wireless communication devices is switched based on a pseudo random number, and
the pseudo random number is generated based on the time information and a unique number associated with each wireless communication device of the plurality of wireless communication devices;
a storage unit configured to store the position information of the plurality of wireless communication devices and the time information at which the position information of each wireless communication device of the plurality of wireless communication devices is acquired, wherein the position information and the time information of each wireless communication device of the plurality of wireless communication devices are stored in association with each other; and
a display control unit configured to control display of a first position information of a first wireless communication device of the plurality of wireless communication devices and a second position information of a second wireless communication device of the plurality of wireless communication devices at a same time, wherein a first time information associated with the first position information and a second time information associated with the second position information indicate that the first position information of the first wireless communication device and the second position information of the second wireless communication device are acquired at a same timing.

10. A display control method, comprising:
receiving, by a communication unit, transmission data from a server, wherein
the transmission data includes position information of a plurality of wireless communication devices and time information at which the position information of each wireless communication device of the plurality of wireless communication devices is acquired,
the transmission data is transmitted from a wireless communication device of the plurality of wireless communication devices in a determined transmission slot,
the determined transmission slot is a combination of a transmission timing and a transmission frequency that are different for each wireless communication device of the plurality of wireless communication devices,
the transmission frequency of each wireless communication device of the plurality of wireless communication devices is switched based on a pseudo random number, and
the pseudo random number is generated based on the time information and a unique number associated with each wireless communication device of the plurality of wireless communication devices;
storing, by a storage unit, the position information of the plurality of wireless communication devices and the time information at which the position information of each wireless communication device of the plurality of wireless communication devices is acquired, wherein the position information and the time information of each wireless communication device of the plurality of wireless communication devices are stored in association with each other; and
controlling, by a display control unit, display of a first position information of a first wireless communication device of the plurality of wireless communication devices and a second position information of a second wireless communication device of the plurality of wireless communication devices at a same time, wherein a first time information associated with the first position information and a second time information associated with the second position information indicate that the first position information of the first wireless communication device and the second position information of the second wireless communication device are acquired at a same timing.

* * * * *